United States Patent
Zhang et al.

(10) Patent No.: US 12,452,479 B2
(45) Date of Patent: Oct. 21, 2025

(54) DISPLAYING MULTIMEDIA SEGMENTS IN A DISPLAY DEVICE

(71) Applicant: ROKU, INC., San Jose, CA (US)

(72) Inventors: Dengzhi Zhang, San Jose, CA (US); Hugo Du Plooy, San Jose, CA (US)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 17/963,459

(22) Filed: Oct. 11, 2022

(65) Prior Publication Data

US 2024/0121467 A1     Apr. 11, 2024

(51) Int. Cl.
| | |
|---|---|
| *H04N 21/431* | (2011.01) |
| *H04N 7/01* | (2006.01) |
| *H04N 21/422* | (2011.01) |
| *H04N 21/472* | (2011.01) |
| *H04N 21/81* | (2011.01) |

(52) U.S. Cl.
CPC ......... *H04N 21/4316* (2013.01); *H04N 7/01* (2013.01); *H04N 21/4222* (2013.01); *H04N 21/472* (2013.01); *H04N 21/812* (2013.01)

(58) Field of Classification Search
CPC .. H04N 21/4316; H04N 7/01; H04N 21/4222; H04N 21/472; H04N 21/812
USPC ...................................................... 348/734
See application file for complete search history.

(56) References Cited

U.S. PATENT DOCUMENTS

| | | | |
|---|---|---|---|
| 6,442,755 B1 * | 8/2002 | Lemmons .......... | H04N 21/4622 725/51 |
| 2005/0157171 A1 * | 7/2005 | Bowser .................. | G09G 3/007 348/E5.111 |
| 2015/0312633 A1 * | 10/2015 | Masciarotte ....... | G06Q 30/0261 725/32 |
| 2022/0197675 A1 * | 6/2022 | Adler .................... | G06F 3/0481 |
| 2022/0300241 A1 * | 9/2022 | Song ..................... | H04N 5/655 |
| 2023/0021994 A1 * | 1/2023 | Gu ................... | H04N 21/43615 |

* cited by examiner

*Primary Examiner* — John W Miller
*Assistant Examiner* — Omer Khalid
(74) *Attorney, Agent, or Firm* — STERNE, KESSLER, GOLDSTEIN & FOX P.L.L.C.

(57) ABSTRACT

Disclosed herein are system, apparatus, method and/or computer program product embodiments for a multimedia environment that includes a computing device to display a multimedia segment within a display area of a display device including multiple display areas. The computing device may determine a multimedia segment including a plurality of frames, and display the multimedia segment within a first display area of the display device. The display device includes the first display area and a second display area disjoint from the first display area, and each of the plurality of frames of the multimedia segment are displayed within the first display area. The multimedia segment can be in a first format, and the first display area and the second display area together has a capability to display the multimedia segment in a second format different from the first format.

20 Claims, 6 Drawing Sheets

DISPLAYING MULTIMEDIA SEGMENTS IN A DISPLAY DEVICE

BACKGROUND

Field

This disclosure is generally directed to displaying multimedia segments or content in a display device.

Background

Television, sometimes shortened to TV, is a communication medium for displaying multimedia content including video and audio. Generally, the term can refer to a television set, or the medium of television transmission. Television is a mass medium for entertainment, news, and sports, advertising. Digital television (DTV) is the transmission and display of audio and video by digitally processed and multiplexed signals, in contrast to the analog signals used by traditional analog television. A TV set can be generally viewed as a display device to display images and sounds, e.g., multimedia segments or content. However, there are still challenges on how to display various multimedia segments or content in a display device, such as a TV set.

SUMMARY

Provided herein are system, apparatus, article of manufacture, method and/or computer program product embodiments, and/or combinations and sub-combinations thereof, for displaying a multimedia segment within a display area of a display device, where the display device includes multiple display areas. An example of a display device can be a television (TV) or a TV set, although this disclosure is not limited to that embodiment.

An example embodiment of a multimedia environment includes a display device and a computing device which can serve as a media device. The media device may perform a method including various operations. In some embodiments, the media device may determine, by at least one processor, a multimedia segment including a plurality of frames. In addition, the media device can display the multimedia segment within a first display area of the display device. The first display area is only a part of the overall display area of the display device. The overall display area of the display device can include the first display area and a second display area disjoint from the first display area. Each of the plurality of frames of the multimedia segment are displayed within the first display area. In some embodiments, the first display area and the second display area can be of a rectangular shape of a substantially same height. In some embodiments, the display device can be configured to provide resolutions selected from 1920×1080 pixels, 1280×720 pixels, 2560× 1440 pixels, 2048×1080 pixels, 3840×2160 pixels, 7680× 4320 pixels, 640×480 pixels, or any other resolutions known to one having ordinary skills in the art. In some embodiments, the multimedia segment can be created in a portrait format by a mobile device, each of the plurality of frames of the multimedia segment can be displayed within the first display area in the vertical format, and the display device is a smart TV capable of displaying the multimedia segment in a landscape format.

In some embodiments, the multimedia segment can be in a first format displayed in the first display area. The overall display area includes the first display area and the second display area. Hence, the overall display area is larger than the first display area and can have a capability to display the multimedia segment in a second format different from the first format. The first format can include a first video aspect ratio, and the second format can include a second video aspect ratio. At any given time, the first video aspect ratio or the second video aspect ratio can include a ratio of one of 4:3, 16:9, 1.77:1, 1.9:1, or any other aspect ratio known to one having the ordinary skills in the art.

In some embodiments, the media device may display substantially concurrently a creator profile of the multimedia segment or an advertisement related to the multimedia segment in the second display area of the display device. In some embodiments, the display device further includes a third display area disjoint from the first display area, and the media device may display substantially concurrently the creator profile of the multimedia segment in the second display area of the display device, and display substantially concurrently the advertisement related to the multimedia segment in the third display area. In some embodiments, the second display area may be adjacent to the first display area at a first side, and the third display area may be adjacent to the first display area at a second side opposite to the first side. In some embodiments, the displaying the multimedia segment within the first display area may be controlled by a first control element of a remote control device of the display device, and the displaying the creator profile of the multimedia segment or the advertisement related to the multimedia segment in the second display area of the display device can be controlled by a second control element of the remote control device.

In some embodiments, a remote control device can be used to control the operations of the media device and the display device. The remote control device can include a transceiver, a plurality of control elements, and at least one controller coupled to the transceiver and the plurality of control elements. The transceiver can wirelessly communicate with at least a processor of the display device. The plurality of control elements can control a multimedia segment including a plurality of frames to be displayed within a first display area of the display device, where the display device includes the first display area and a second display area disjoint from the first display area, and each of the plurality of frames of the multimedia segment is displayed within the first display area. The at least one controller can receive an input from a first control element of the plurality of control elements, and transmit the input to control the multimedia segment being displayed within the first display area. In some embodiments, the remote control device further includes a second control element to control displaying substantially concurrently a creator profile of the multimedia segment or an advertisement related to the multimedia segment in the second display area of the display device.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Television, sometimes shortened to TV, can display multimedia segments or content including images and sound. Digital television (DTV) is the transmission of audio and video by digitally processed and multiplexed signals, in contrast to the totally analog signals used by analog television. TV can be generally viewed as a display device to display multimedia segments or content. The content being displayed onto a display device together with the display device itself have been evolving. In some ways, the traditional movie, such as a film being displayed onto a film screen, can be viewed as first generation multimedia content, while the traditional broadcast TV content displayed onto a TV set can be viewed as second generation multimedia content. In addition, computer monitor based video content, such as YouTube® multimedia content can be viewed as third generation multimedia content. Moreover, smart phone based multimedia content, such as short duration video, e.g., TikTok® video or Instagram @ video, can be viewed as fourth generation multimedia content. Accordingly, the display device may include a movie screen, a TV set, a computer monitor, or a smart phone or other handheld devices. Various multimedia contents displayed on a display device can have its advantages and useful features. For example, a movie displayed onto a film screen can last 90 to 180 minutes normally so that viewers can sit through in a theater. TV series are suitable for people to watch in front of a TV set at night. In addition, YouTube® videos are suitable for people to browse using an internet browser. Furthermore, everyone with a smart phone can create and post short duration videos on TikTok® instantly. Generally, viewing on the big screen, such as a film screen or a TV display have seen significant growth and its popularity has led to the success of YouTube® on the TV set. Accordingly, there can also be great opportunities to bring short duration video taken by smart devices to be displayed on the TV set.

Since most short duration videos are generated with the portrait format or vertical format by a mobile device, it may be better to show the short duration video as the same vertical format on a wide screen TV that normally displays multimedia content in the landscape or horizontal format. As a result, the wide screen TV display can have a blank space on the left and/or right sides of the area where the video being displayed in the portrait format. Hence, some embodiments may utilize the blank spaces that may exist on the left and right sides of the area where the video being displayed. In some embodiments, the area where the video being displayed in the portrait format may be referred to be a first display area, while the blank spaces on the left and right sides of the first display area may be referred to as a second display area or a third display area. Accordingly, the display device may include multiple display areas.

Embodiments herein may present mechanisms for operations performed by a media device to display a multimedia segment within a display area of a display device, where the display device includes multiple display areas. A media device may be coupled to a display device to perform the various operations described herein. In some embodiments, the media device and the display device may be integrated into one device. In some embodiments, the media device may determine, by at least one processor, a multimedia segment including a plurality of frames. In addition, the media device can display the multimedia segment within a first display area of the display device, where the display device includes the first display area and a second display area disjoint from the first display area, and each of the plurality of frames of the multimedia segment are displayed within the first display area. In some embodiments, each of the plurality of frames of the multimedia segment are displayed within the first display area in a first format, e.g., the portrait format. In addition, a creator profile of the multimedia segment or an advertisement related to the multimedia segment may be displayed in the second display area of the display device.

In some embodiments, a remote control device can be used to control the operations of the media device and the display device. The remote control device can include a transceiver, a plurality of control elements, and at least one controller coupled to the transceiver and the plurality of control elements. The plurality of control elements can control a multimedia segment including a plurality of frames to be displayed within a first display area of the display device. The at least one controller can receive an input from a first control element of the plurality of control elements, and transmit the input to control the multimedia segment being displayed within the first display area. In addition, the at least one controller can receive an input from a second control element of the plurality of control elements to control displaying substantially concurrently a creator profile of the multimedia segment or an advertisement related to the multimedia segment in the second display area of the display device.

Figure 1A:
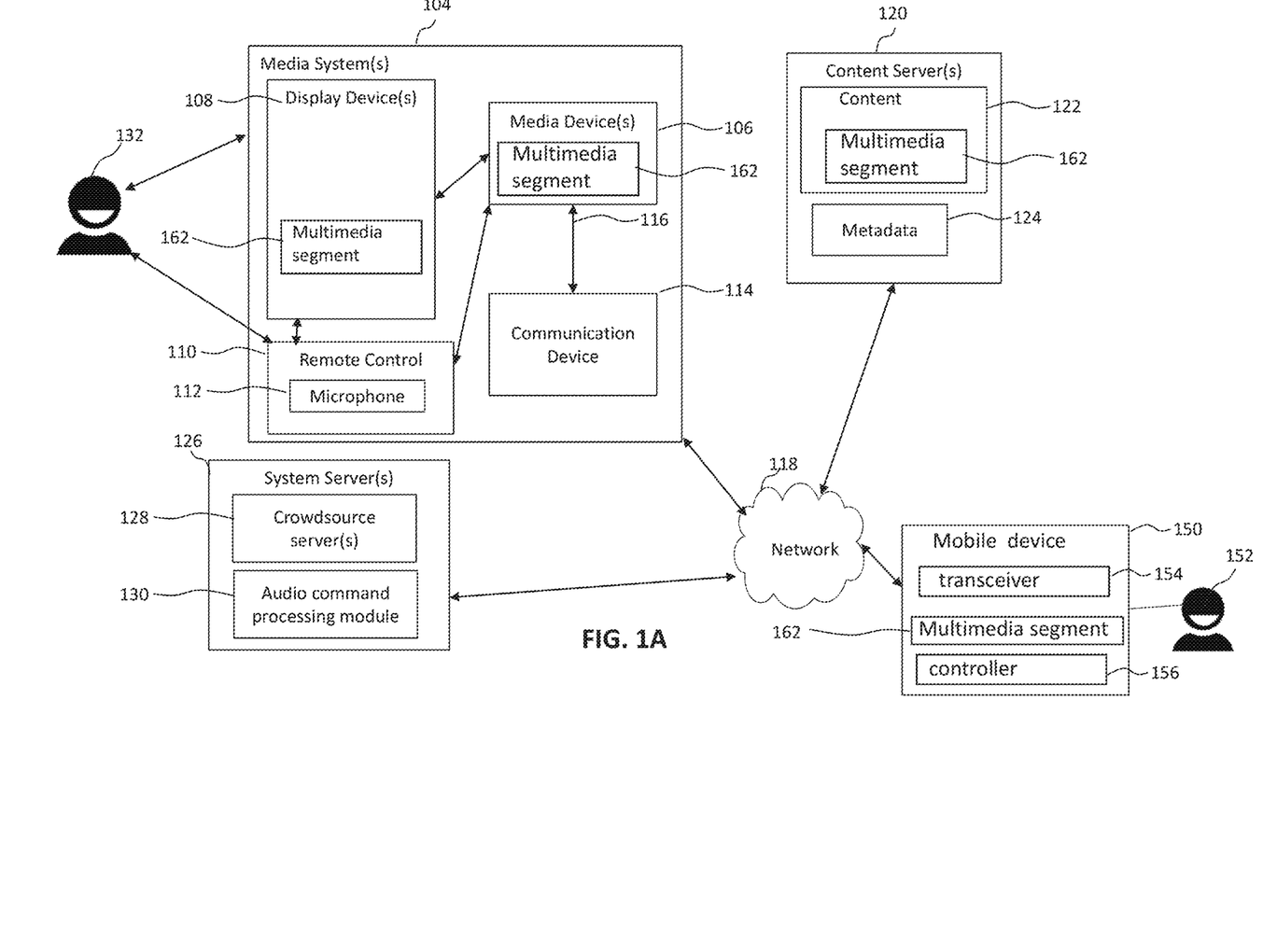
FIGS. 1A-1B illustrate a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to multimedia environment 102, as will be appreciated by persons skilled in the relevant art(s) based on the teachings contained herein. An example of multimedia environment 102 shall now be described.

Multimedia Environment

FIG. 1 illustrates a block diagram of multimedia environment 102, according to some embodiments. Multimedia environment 102 illustrates an example environment, architecture, ecosystem, etc., in which various embodiments of this disclosure may be implemented. However, multimedia environment 102 is provided solely for illustrative purposes, and is not limiting. Embodiments of this disclosure may be implemented and/or used in environments different from and/or in addition to multimedia environment 102 of FIG. 1, as will be appreciated by persons skilled in the relevant art(s) based on the teachings contained herein.

In a non-limiting example, multimedia environment 102 may be directed to streaming media. However, this disclosure is applicable to any type of media (instead of or in addition to streaming media), as well as any mechanism, means, protocol, method and/or process for distributing media.

Multimedia environment 102 may include one or more media systems 104. Media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with media system 104 to select and consume content. User 132 may interact with media system 104 through a remote control device 110. User 132 may be a viewer, a consumer, or both.

Each media system 104 may include one or more media devices 106 each coupled to one or more display devices 108. Media device 106 may be referred to as a computing device as well. It is noted that terms such as "coupled," "connected to," "attached," "linked," "combined" and similar terms may refer to physical, electrical, magnetic, logical, etc., connections, unless otherwise specified herein.

Media device 106 may be a streaming media device, a streaming set-top box (STB), cable and satellite STB, a DVD or BLU-RAY device, an audio/video playback device, cable box, and/or a digital video recording device, to name just a few examples. Display device 108 may be a monitor, a television (TV), a computer, a computer monitor, a smart phone, a tablet, a wearable (such as a watch or glasses), an appliance, an internet of things (IoT) device, and/or a projector, to name just a few examples. In some embodiments, media device 106 can be a part of, integrated with, attached to, operatively coupled to, and/or connected to its respective display device 108. Media device 106 can provide media content, such as media segment 162 to display device 108.

Figure 1B:
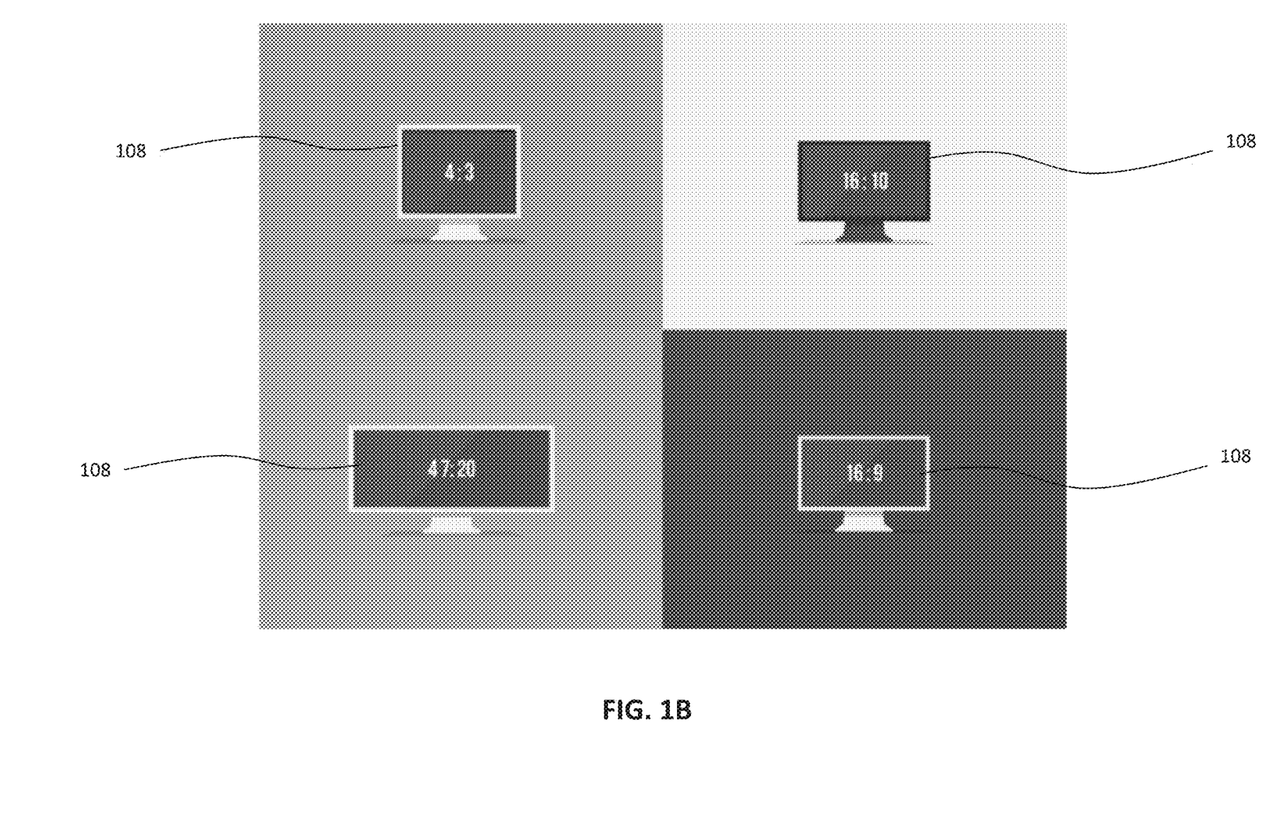

In some embodiments, display device 108 can provide resolutions selected from 1920×1080 pixels, 1280×720 pixels, 2560×1440 pixels, 2048×1080 pixels, 3840×2160 pixels, 7680×4320 pixels, 640×480 pixels, or any other resolutions known to one having ordinary skills in the art. Display device 108 can support a video aspect ratio such as 4:3, 16:9, 1.77:1, 1.9:1, as shown in FIG. 1B. Display device 108 can support other aspect ratio as well. Display device 108 can be a TV set, such as a smart TV.

Each media device 106 may be configured to communicate with network 118 via a communication device 114. Communication device 114 may include, for example, a cable modem or satellite TV transceiver. Media device 106 may communicate with communication device 114 over a link 116, where link 116 may include wireless (such as WiFi) and/or wired connections.

In various embodiments, network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control device 110. Remote control device 110 can be any component, part, apparatus and/or method for controlling media device 106, display device 108, such as a remote control device, a tablet, laptop computer, smartphone, wearable, on-screen controls, integrated control buttons, audio controls, or any combination thereof, to name just a few examples. In an embodiment, remote control device 110 wirelessly communicates with media device 106, or display device 108 using cellular, Bluetooth, infrared, etc., or any combination thereof.

Multimedia environment 102 may include a plurality of content servers 120 (also called content providers). Although only one content server 120 is shown in FIG. 1A, in practice the multimedia environment 102 may include any number of content servers 120. Each content server 120 may be configured to communicate with network 118.

Each content server 120 may store content 122 and metadata 124. Content 122 may include multimedia segment 162, which can include any combination of music, videos, movies, TV programs, multimedia, images, still pictures, text, graphics, gaming applications, advertisements, programming content, public service content, government content, local community content, software, and/or any other content or data objects in electronic form. Content 122 may be the source for media content, e.g., multimedia segment 162, stored in media device 106 and displayed on display device 108.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to content 122. Metadata 124 may also or alternatively include links to any such information pertaining or relating to content 122. Metadata 124 may also or alternatively include one or more indexes of content 122, such as but not limited to a trick mode index.

Multimedia environment 102 may include one or more system servers 126. System servers 126 may operate to support media device 106 from the cloud. It is noted that the structural and functional aspects of system servers 126 may wholly or partially exist in the same or different ones of system servers 126. System servers 126 and content server 120 together may be referred to as a media server system. An overall media system may include a media server system and media system 104. In some embodiments, a media system may refer to the overall media system including the media server system and media system 104.

Media devices 106 may exist in thousands or millions of media systems 104. Accordingly, media devices 106 may lend themselves to crowdsourcing embodiments and, thus, system servers 126 may include one or more crowdsource servers 128.

For example, using information received from media devices 106 in the thousands and millions of media systems 104, crowdsource server(s) 128 may identify similarities and overlaps between closed captioning requests issued by different users 132 watching a particular movie. Based on such information, crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, crowdsource server(s) 128 may operate to cause closed captioning to be automatically turned on and/or off during future streaming of the movie.

System servers 126 may also include an audio command processing module 130. As noted above, remote control device 110 may include a microphone 112. Microphone 112 may receive audio data from user 132 (as well as other sources, such as display device 108). In some embodiments, media device 106 may be audio responsive, and the audio data may represent verbal commands from user 132 to control media device 106 as well as other components in media system 104, such as display device 108.

In some embodiments, the audio data received by microphone 112 in remote control device 110 is transferred to media device 106, which is then forwarded to audio command processing module 130 in system servers 126. Audio command processing module 130 may operate to process and analyze the received audio data to recognize a verbal command from user 132. Audio command processing module 130 may then forward the verbal command back to media device 106 for processing.

Figure 2:
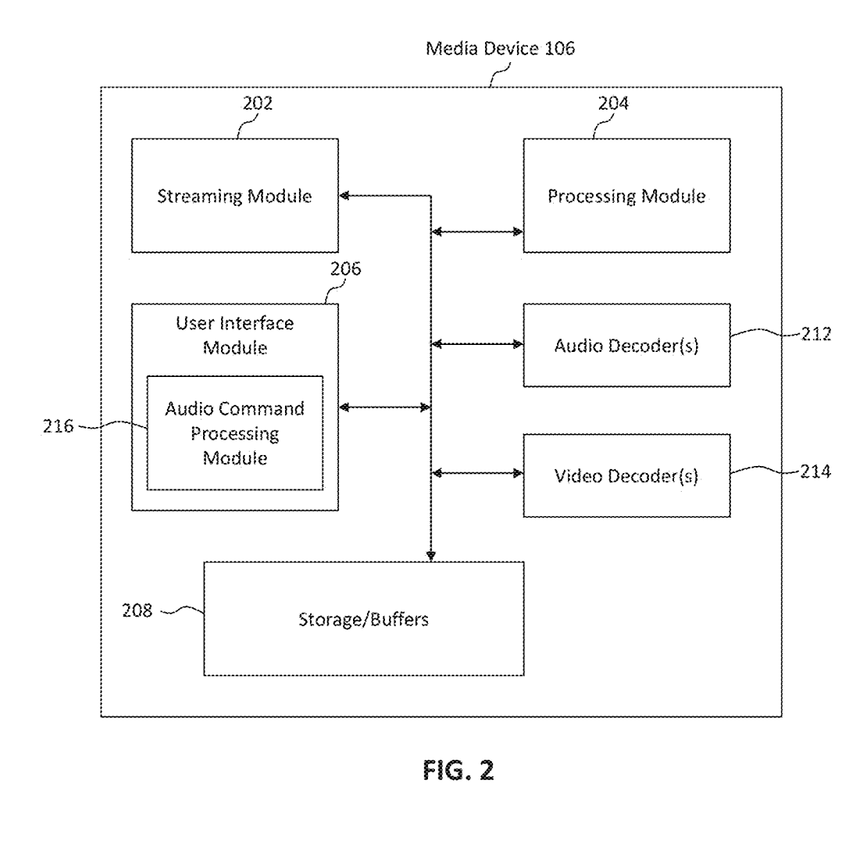
FIG. 2 illustrates a block diagram of a streaming media device, according to some embodiments.

In some embodiments, the audio data may be alternatively or additionally processed and analyzed by an audio command processing module 216 in media device 106 (see FIG. 2). Media device 106 and system servers 126 may then cooperate to pick one of the verbal commands to process (either the verbal command recognized by audio command processing module 130 in system servers 126, or the verbal command recognized by audio command processing module 216 in media device 106).

In some embodiments, multimedia environment 102 may include a mobile device 150 accessed by a user or consumer 152. In some embodiments, mobile device 150 can include a transceiver 154 configured to wirelessly communicate with a computing device, and a controller 156 coupled to the transceiver and configured to perform various operations. Communication between mobile device 150 with the computing device such as media device 106 or content sever 120 may be through transceiver 154 and network 118. User 152 may generate multimedia segment 162 using mobile device 150, where multimedia segment 162 may be uploaded into content server 120, and further transmitted to media device 106 and displayed on display device 108.

In some embodiments, multimedia segment 162 may be created in a vertical format by mobile device 150, and display device 108 may be a smart television (TV) capable to display the multimedia segment in a horizontal format.

In some embodiments, mobile device 150 can include a handheld terminal, a cellular phone (e.g., a smart phone), a personal digital assistant (PDA), a wireless modem, a wireless communication device, a handheld device, a laptop, a desktop, a cordless phone, a wireless local loop station, a tablet, a camera, a gaming device, a netbook, an ultrabook, a wearable device (smart watch, smart clothing, smart glasses, smart wrist band, smart jewelry such as smart ring or smart bracelet), an entertainment device (e.g., a music or video device, or a satellite radio), a vehicular component, an Internet-of-Things (IoT) device, a machine-type communication (MTC) device, an evolved or enhanced machine-type communication (eMTC) device, or any other suitable device that is configured to communicate via a wireless medium.

FIG. 2 illustrates a block diagram of an example media device 106, according to some embodiments. Media device 106 may include a streaming module 202, a processing module 204, a storage/buffers 208, and a user interface module 206. As described above, user interface module 206 may include audio command processing module 216.

Media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OPla, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, user 132 may interact with media device 106 and display device 108 via, for example, remote control device 110. For example, user 132 may use remote control device 110 to interact with user interface module 206 of media device 106 to select content, such as a movie, TV show, music, book, application, game, etc. Streaming module 202 of media device 106 may request the selected content from content server(s) 120 over network 118. Content server(s) 120 may transmit the requested content to streaming module 202. Media device 106 may transmit the received content to display device 108 for playback to user 132. Mobile device 150 may provide additional control and communication with media device 106.

In some embodiments, streaming module 202 may transmit the content to display device 108 in real time or near real time as it receives such content from content server(s) 120. In some embodiments, media device 106 may store the content received from content server(s) 120 in storage/buffers 208 for later playback on display device 108.

Coordination Between a Media Device, a Mobile Device, and a Display Device.

Figure 3:
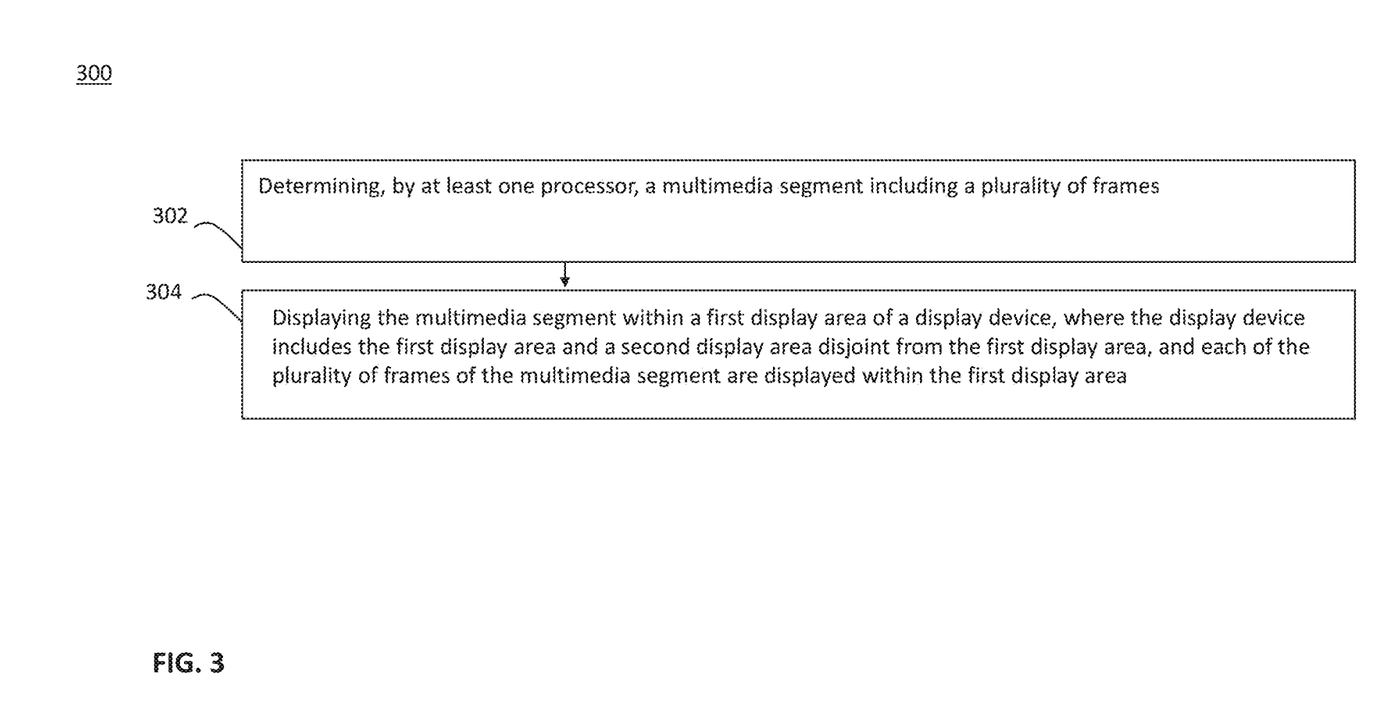
FIG. 3 illustrates an example process for displaying a multimedia segment within a display area of a display device including multiple display areas, according to some embodiments.

FIG. 3 illustrates an example process 300 for displaying multimedia segment 162 within a display area of a display device including multiple display areas, according to some embodiments. In some embodiments, process 300 can be performed by a computing device, such as media device 106 or display device 108, or the combination of both even though some descriptions may be provided for media device 106 only. Descriptions below may use media device 106 as an example of a computing device. Processes 300 can be performed by processing logic that can comprise hardware (e.g., circuitry, dedicated logic, programmable logic, microcode, etc.), software (e.g., instructions executing on a processing device, such as by controller or a processor), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Figure 4:
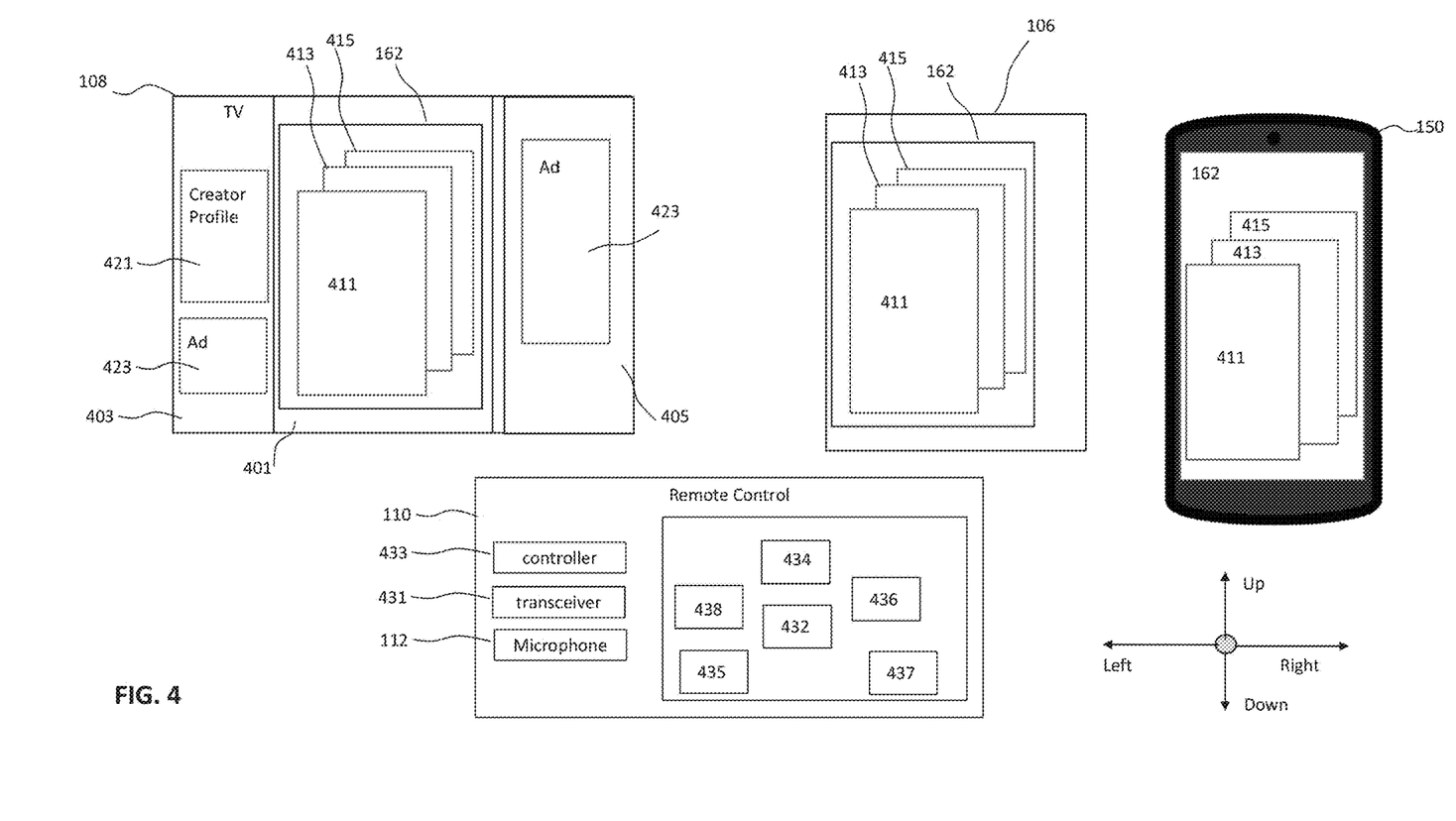
FIG. 4 illustrates an example multimedia environment to control the displaying a multimedia segment within a display area of a display device including multiple display areas, according to some embodiments.

At 302, media device 106 can determine, by at least one processor of media device 106, a multimedia segment including a plurality of frames. For example, as shown in FIG. 4, media device 106 can determine, by at least one processor of media device 106, multimedia segment 162 including a plurality of frames, such as a frame 411, a frame 413, or a frame 415. The multiple frames, such as frame 411, frame 413, or frame 415 may be generated by mobile device 150, and may be processed by media device 106 and displayed by display device 108.

At 304, media device 106 can display the multimedia segment within a first display area of a display device, where the display device can include the first display area and a second display area disjoint from the first display area, and each of the plurality of frames of the multimedia segment are displayed within the first display area. For example, as shown in FIG. 4, media device 106 can display multimedia segment 162 within a first display area 401 of display device 108, where display device 108 can include the first display area 401 and a second display area 403 disjoint from the first display area. Each of the plurality of frames, such as frame 411, frame 413, and frame 415, of the multimedia segment 162 are displayed within the first display area 401. By limiting each of the plurality of frames, such as frame 411, frame 413, and frame 415, of multimedia segment 162 to be displayed within the first display area 401, embodiments can enable other display areas, such as the second display area 403 to be used for other purpose, since the content of multimedia segment 162 would not be displayed, overlap, or intersect with other display areas such as the second display area 403. Accordingly, embodiments herein are different from displaying a multimedia segment into a display device, where a frame may only occupy a part of the display area. For multimedia segment 162, all the content of frames of multimedia segment 162 are limited to be displayed within the first display area 401. In addition, the size or ratio of the first display area 401 may be predetermined based on the format of multimedia segment 162, but may not depend on the content of multimedia segment 162. The content of multimedia segment 162, such as frame 411, frame 413, and frame 415 can be represented by different video format including video aspect ratios, resolutions, and many other format parameters. In some embodiments, the format of multimedia segment 162 may be determined by the device generating multimedia segment 162, such as mobile device 150, which uses a format such as the vertical format different from the format for the display device 108 such as the horizontal format.

In some embodiments, the first display area 401 and the second display area 403 may be of a rectangular shape of a substantially same height, as shown in FIG. 4. In some embodiments, media device 106 may display substantially concurrently a creator profile 421 of multimedia segment 162 or an advertisement 423 related to multimedia segment 162 in the second display area 403 of display device 108. Advertisement 423 related to multimedia segment 162 displayed at the second display area 403 can be relevant to the multimedia content being displayed in the first display area 401, and hence engaging the viewers or customers.

Even though three display areas, such as the first display area 401, the second display area 403, and a third display area 405 are shown in FIG. 4, in some embodiments, display device 108 may only include two display areas such as the first display area 401 and the second display area 403. In some embodiments, the first display area 401 and the second display area 403 can be of different shapes, not shown. For example, the second display area 403 can be a smaller rectangle than the first display area 401, or an oval, a circle, a square, or some other shapes. In some embodiments, there can be a plurality of display areas such as 2 display areas, 3 display areas, or more different and separated display areas of display device 108.

In some embodiments, multimedia segment 162 may be in a first format, e.g., the vertical format, displayed in the first display area 401. In addition, the first display area 401 and the second display area 403 together has a capability to display the multimedia segment 162 in a second format different from the first format. In some embodiments, the first format can include a first video aspect ratio, and the second format includes a second video aspect ratio different from the first video aspect ratio. In some embodiments, at any given time the first video aspect ratio or the second video aspect ratio includes a ratio of one of 19:6, 4:3, 16:10, 47:20, 16:9, 1.375:1, 1.78:1, 1.85:1, 2.39:1, 2.40:1, 2.35:1, 2.39:1, 9:16, 4:5, or any other aspect ratio known to one having ordinary skills in the art.

In some embodiments, display device 108 can further include the third display area 405 disjoint from the first display area 401. In addition, the third display area 405 can be disjoint from the second display area 403. In some embodiments, the first display area 401, the second display area 403, and the third display area 405 may be of a rectangular shape of a substantially same height, as shown in FIG. 4. In some embodiments, the second display area 403 can be adjacent to the first display area 401 at a first side, e.g., a left side, and the third display area 405 can be adjacent to the first display area 401 at a second side opposite to the first side, e.g., right side. In some embodiments, media device 106 may display substantially concurrently creator profile 421 of multimedia segment 162 in the second display area 403, and display substantially concurrently advertisement 423 related to multimedia segment 162 on the third display area 405. In some embodiments, by being displayed substantially concurrently, creator profile 421, advertisement 423, and frames of multimedia segment 162 can be displayed at an exact time instance, or within a small allowable time interval which may depend on the system performance and coordination. For example, in some embodiments, a small allowable time interval may be within 1 microsecond, or 1 second, depending on the content and the application of multimedia segment 162, creator profile 421, and advertisement 423.

In some embodiments, remote control device 110 can be used to control the displaying multimedia segment 162 within the first display area 401. Remote control device 110 can include a transceiver 431 configured to wirelessly communicate with at least a processor of the display device 108. Remote control device 110 can also include a plurality of control elements, such as a control element 432, a control element 434, a control element 435, a control element 436, a control element 437, and a control element 438, to control multimedia segment 162 including a plurality of frames such as frame 411, frame 413, frame 415, to be displayed within the first display area 401 of display device 108. Remote control device 110 also includes at least one controller 433 coupled to the transceiver 431 and the plurality of control elements, configured to perform various operations. The at least one controller 433 may be an example only, and remote control device 110 may include multiple controllers working together to perform the functions described herein, where some of the controllers may be located in other devices or in the cloud computing environment. Control elements, such as control element 435 may be buttons, or some other control means, such as keys. In some embodiments, remote control device 110 can be a mobile device, the plurality of control elements are displayed on a screen of the mobile device and implemented by a software application operated by the mobile device.

In some embodiments, control element 435 may control the display of multimedia segment 162 including a plurality of frames such as frame 411, frame 413, frame 415, within the first display area 401 of display device 108. When control element 435 is pressed once and released, multimedia segment 162 may be played or controlled. In some embodiments, control element 435 may be activated by voice control or command. In some embodiments, when operations can be performed to control the display of multimedia segment 162, multimedia segment 162 may be referred to as an active display content. Similarly, control element 437 may control the displaying the creator profile 421 of the multimedia segment 162 or the advertisement 423 related to the multimedia segment 162 in the second display area 403 of the display device 108.

In some embodiments, the at least one controller 433 can be coupled to transceiver 431 and the plurality of control elements and configured to receive an input from a first control element, e.g., control element 435, and transmit the input to control the multimedia segment 162 being displayed within the first display area. Control element 437 can control displaying substantially concurrently creator profile 421 of multimedia segment 162 or advertisement 423 related to multimedia segment 162 in the second display area 403 of the display device 108. The at least one controller 433 can receive a second input from the control element 437, and transmit the second input to control the displaying creator profile 421 or advertisement 423 in the second display area 403.

In some embodiments, the remote control device can further include a third control element 436 to select the multimedia segment as an active display content, and a fourth control element 438 to select the creator profile or the advertisement as the active display content. The multiple control elements can be arranged in various format. For example, the multiple control elements can be arranged in an aligned vertical or horizontal line, or arranged as shown in FIG. 4 in up, down, left, and right directions. In some embodiments, the third control element 436 can include a right control element to select the multimedia segment 162 as the active display content, and the fourth control element 438 can include a left control element to select the creator profile 421 or the advertisement 423 as the active display content.

In some embodiments, multimedia segment 162 can be one of a plurality of multimedia segments including a previous multimedia segment and a next multimedia segment stored in media device 106 or content server 120. Remote control device 110 can include a down control element, e.g., control element 432, to select the next multimedia segment to be displayed within the first display area 401, an up control element 434 to select the previous multimedia segment to be displayed within the first display area 401. In addition, control element 438 can be the left control element to select the creator profile of the multimedia segment to be an active display content displayed in the second display area 403, control element 436 can be the right control element to select the multimedia segment as the active display content to be displayed within the first display area. In addition, various other control elements, such as fast forwarding control element or backward control element for the advertisement 423 or the multimedia segment 162, voting control element, and any other control elements known to one having the ordinary skills in the arts can be arranged on remote control device 110 as well.

Example Computer System

Figure 5:
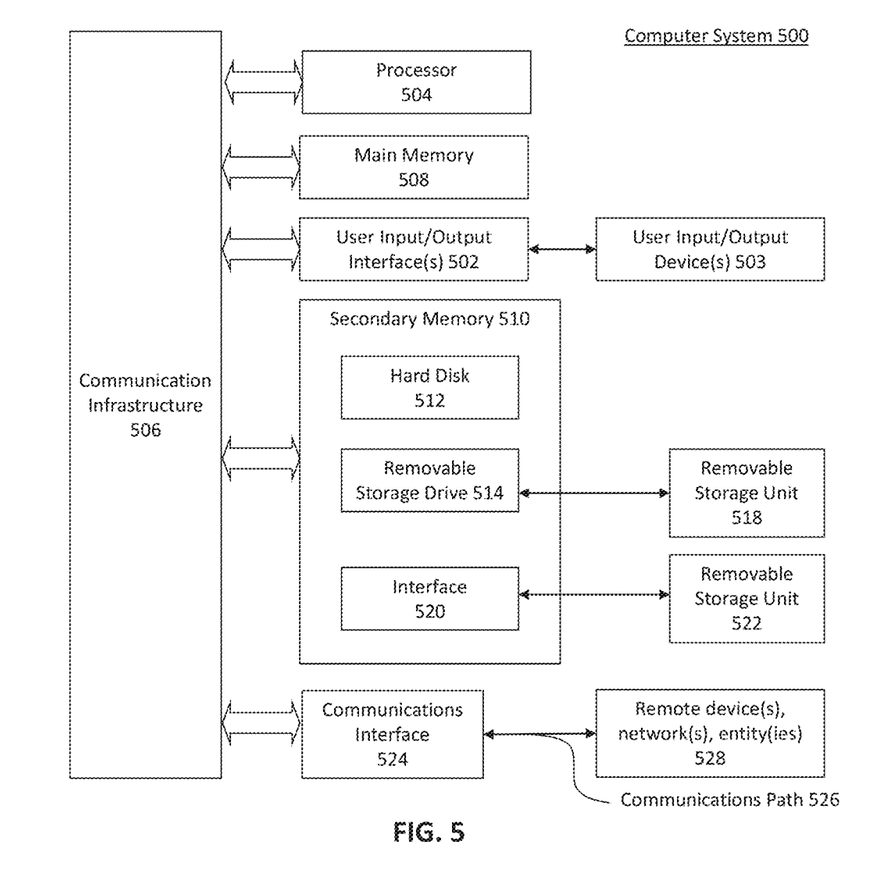
FIG. 5 illustrates an example computer system useful for implementing various embodiments.

Various embodiments may be implemented, for example, using one or more well-known computer systems, such as computer system 500 shown in FIG. 5. For example, media device 106, display device 108, content server 120, system server 126, mobile device 150, may be implemented using combinations or sub-combinations of computer system 500 to perform various functions described herein, e.g., by process 300. Also or alternatively, one or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500 or processor(s) 504), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
   determining, by at least one processor, a multimedia segment including a plurality of frames that are in a portrait format; and
   displaying the multimedia segment within a first display area of a wide screen display device, wherein the wide screen display device includes the first display area, a second display area, and a third display area, wherein display of the multimedia segment generates the second display area adjacent to a first side of the first display area and generates the third display area adjacent to a second side of the first display area that is opposite to the first side, wherein each of the plurality of frames of the multimedia segment are displayed within the first display area, and wherein a first size of the first display area, a second size of the second display area, and a third size of the third display area are based on an aspect ratio of the multimedia segment,
   wherein the displaying the multimedia segment within the first display area is controlled by a first control element of a remote control device of the wide screen display device, and the displaying of at least one of a content creator profile of the multimedia segment or an advertisement related to the multimedia segment within at least one of the second display area or the third display area is controlled by a second control element of the remote control device.

2. The method of claim 1, wherein the first display area and the second display area are of a rectangular shape of a substantially same height.

3. The method of claim 1, wherein the multimedia segment is in a first format, and the first display area and the second display area together have a capability to display the multimedia segment in a second format different from the first format.

4. The method of claim 3, wherein the first format includes a first video aspect ratio, and the second format includes a second video aspect ratio different from the first video aspect ratio.

5. The method of claim 4, wherein at any given time the first video aspect ratio or the second video aspect ratio includes a ratio of one of 19:6, 4:3, 16:10, 47:20, 16:9, 1.375:1, 1.78:1, 1.85:1, 2.39:1, 2.40:1, 2.35:1, 2.39:1, 9:16, and 4:5.

6. The method of claim 1, wherein the wide screen display device is configured to provide resolutions selected from 1080×1920 pixels, 1280×720 pixels, 2560×1440 pixels, 2048×1080 pixels, 3840×2160 pixels, 7680×4320 pixels, 854×480 pixels, 640×360 pixels, and 426×240 pixels.

7. The method of claim 1, wherein the content creator profile of the multimedia segment is displayed within the second display area and the advertisement related to the multimedia segment is displayed within the third display area, and wherein the content creator profile and the advertisement are display concurrently.

8. The method of claim 1, wherein the multimedia segment is created in a vertical format by a mobile device, each of the plurality of frames of the multimedia segment is displayed within the first display area in the vertical format, and the wide screen display device is a smart television (TV) capable to display the multimedia segment in a horizontal format.

9. A non-transitory computer-readable medium having instructions stored thereon that, when executed by at least a computing device, cause the computing device to perform operations comprising:
  determining a multimedia segment including a plurality of frames that are in a portrait format;
  displaying the multimedia segment within a first display area of a wide screen display device, wherein the wide screen display device includes the first display area, a second display area, and a third display area, wherein display of the multimedia segment generates the second display area adjacent to a first side of the first display area and generates the third display area adjacent to a second side of the first display area that is opposite to the first side, wherein each of the plurality of frames of the multimedia segment are displayed within the first display area, and wherein a first size of the first display area, a second size of the second display area, and a third size of the third display area are based on an aspect ratio of the multimedia segment,
  wherein the displaying the multimedia segment within the first display area is controlled by a first control element of a remote control device of the wide screen display device, and the displaying of at least one of a content creator profile of the multimedia segment or an advertisement related to the multimedia segment within at least one of the second display area or the third display area is controlled by a second control element of the remote control device.

10. A system, comprising:
  one or more memories; and
  at least one processor each coupled to at least one of the one or more memories and configured to perform operations comprising:
    determining a multimedia segment including a plurality of frames that are in a portrait format;
    displaying the multimedia segment within a first display area of a wide screen display device, wherein the wide screen display device includes the first display area, a second display area, and a third display area, wherein display of the multimedia segment generates the second display area adjacent to a first side of the first display area and generates the third display area adjacent to a second side of the first display area that is opposite to the first side, wherein each of the plurality of frames of the multimedia segment are displayed within the first display area, and wherein a first size of the first display area, a second size of the second display area, and a third size of the third display area are based on an aspect ratio of the multimedia segment,
    wherein the displaying the multimedia segment within the first display area is controlled by a first control element of a remote control device of the wide screen display device, and the displaying of at least one of a content creator profile of the multimedia segment or an advertisement related to the multimedia segment within at least one of the second display area or the third display area is controlled by a second control element of the remote control device.

11. The system of claim 10, wherein the first display area and the second display area are of a rectangular shape of a substantially same height.

12. The system of claim 10, wherein the multimedia segment is in a first format, and the first display area and the second display area together have a capability to display the multimedia segment in a second format different from the first format.

13. The system of claim 12, wherein the first format includes a first video aspect ratio, and the second format includes a second video aspect ratio different from the first video aspect ratio.

14. The system of claim 13, wherein at any given time the first video aspect ratio or the second video aspect ratio includes a ratio of one of 19:6, 4:3, 16:10, 47:20, 16:9, 1.375:1, 1.78:1, 1.85:1, 2.39:1, 2.40:1, 2.35:1, 2.39:1, 9:16, and 4:5.

15. The system of claim 10, wherein the wide screen display device is configured to provide resolutions selected from 1080×1920 pixels, 1280×720 pixels, 2560×1440 pixels, 2048×1080 pixels, 3840×2160 pixels, 7680×4320 pixels, 854×480 pixels, 640×360 pixels, and 426×240 pixels.

16. The non-transitory computer-readable medium of claim 9, wherein the first display area and the second display area are of a rectangular shape of a substantially same height.

17. The non-transitory computer-readable medium of claim 9, wherein the multimedia segment is in a first format, and the first display area and the second display area together have a capability to display the multimedia segment in a second format different from the first format.

18. The non-transitory computer-readable medium of claim 17, wherein the first format includes a first video aspect ratio, and the second format includes a second video aspect ratio different from the first video aspect ratio.

19. The non-transitory computer-readable medium of claim 9, wherein the content creator profile of the multimedia segment is displayed within the second display area and the advertisement related to the multimedia segment is displayed within the third display area, and wherein the content creator profile and the advertisement are display concurrently.

20. The non-transitory computer-readable medium of claim 9, wherein the multimedia segment is created in a vertical format by a mobile device, each of the plurality of frames of the multimedia segment is displayed within the first display area in the vertical format, and the wide screen display device is a smart television (TV) capable to display the multimedia segment in a horizontal format.

\* \* \* \* \*